US008995020B2

(12) United States Patent
Okumura et al.

(10) Patent No.: US 8,995,020 B2
(45) Date of Patent: Mar. 31, 2015

(54) PRINT DATA GENERATION DEVICE, PRINTING METHOD, AND PROGRAM (71) Applicant: Seiko Epson Corporation, Tokyo (JP)

(72) Inventors: Yoshio Okumura, Matsumoto (JP); Takashi Kobayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 32 days.

(21) Appl. No.: 13/784,450

(22) Filed: Mar. 4, 2013

(65) Prior Publication Data

US 2013/0286440 A1 Oct. 31, 2013

(30) Foreign Application Priority Data

Apr. 27, 2012 (JP) ................. 2012-103090

(51) Int. Cl.
G06K 15/02 (2006.01)
G06T 11/00 (2006.01)
H04N 1/60 (2006.01)

(52) U.S. Cl.
CPC .............. G06K 15/188 (2013.01); G06T 11/00 (2013.01); H04N 1/60 (2013.01)
USPC ............ 358/3.06; 358/1.9; 358/2.1; 358/518; 358/522; 347/95; 347/100

(58) Field of Classification Search
CPC .................................................. G06K 15/188
See application file for complete search history.

(56) References Cited

U.S. PATENT DOCUMENTS

| 7,054,038 | B1 * | 5/2006 | Ostromoukhov et al. ... 358/3.13 |
| 7,706,604 | B2 | 4/2010 | Berns et al. ................... 382/162 |
| 7,914,102 | B2 * | 3/2011 | Imai ................................ 347/19 |
| 2004/0233463 | A1 * | 11/2004 | Hersch et al. .................. 358/1.9 |
| 2005/0243341 | A1 * | 11/2005 | Ng ................................... 358/1.9 |
| 2006/0187505 | A1 * | 8/2006 | Ng et al. ........................ 358/518 |
| 2007/0002119 | A1 * | 1/2007 | Abrott ............................ 347/105 |
| 2007/0287082 | A1 * | 12/2007 | Ng ................................. 430/47.5 |
| 2009/0207429 | A1 * | 8/2009 | Iguchi ............................ 358/1.9 |
| 2009/0244118 | A1 * | 10/2009 | Kakutani .......................... 347/6 |
| 2009/0244137 | A1 * | 10/2009 | Kakutani ......................... 347/12 |
| 2009/0244168 | A1 * | 10/2009 | Kakutani ......................... 347/21 |
| 2010/0053247 | A1 * | 3/2010 | Kakutani ......................... 347/12 |
| 2010/0053267 | A1 * | 3/2010 | Seishin .......................... 347/43 |
| 2010/0055424 | A1 * | 3/2010 | Yoshida et al. ............... 428/209 |
| 2010/0134811 | A1 * | 6/2010 | Fukasawa et al. ............. 358/1.9 |
| 2010/0177131 | A1 * | 7/2010 | Yoshida .......................... 347/5 |
| 2010/0177354 | A1 * | 7/2010 | Yoshida ........................ 358/3.01 |
| 2010/0177357 | A1 * | 7/2010 | Yoshida ........................ 358/3.21 |
| 2010/0225942 | A1 * | 9/2010 | Murai et al. ................... 358/1.9 |
| 2011/0221805 | A1 * | 9/2011 | Yoshida et al. ................. 347/9 |
| 2011/0221807 | A1 * | 9/2011 | Yoshida .......................... 347/9 |
| 2012/0056922 | A1 * | 3/2012 | Yoshida .......................... 347/9 |
| 2012/0113178 | A1 * | 5/2012 | Yamashita et al. ............. 347/15 |
| 2012/0205426 | A1 * | 8/2012 | Neary .......................... 229/5.83 |

FOREIGN PATENT DOCUMENTS

| JP | 2008-281402 | 11/2008 |
| JP | 2009-233883 | 10/2009 |
| JP | 2010-052225 | 3/2010 |
| JP | 2010-052226 | 3/2010 |
| JP | 4528782 | 6/2010 |
| JP | 2011-124623 | 6/2011 |

* cited by examiner

Primary Examiner — King Poon
Assistant Examiner — Ted Barnes
(74) Attorney, Agent, or Firm — DLA Piper LLP (US)

(57) ABSTRACT

When a skewness of brightness of a print target image is a first skewness, print data is generated such that an ink amount of a metallic ink is a first amount. When the skewness of brightness is a second skewness that is larger than the first skewness, a print data is generated such that the ink amount is a second amount that is larger than the first amount.

6 Claims, 7 Drawing Sheets

PRINT DATA GENERATION DEVICE, PRINTING METHOD, AND PROGRAM

CROSS-REFERENCE TO RELATED APPLICATIONS

The entire disclosure of Japanese Patent Application No. 2012-103090, filed Apr. 27, 2012 is expressly incorporated by reference herein.

BACKGROUND

1. Technical Field

The present invention relates to printing.

2. Related Art

Printing using a metallic color ink (which will be hereinafter also referred to as a "metallic ink") in order to give luster to printed matter is known. Various proposals have been made in order to improve a print image using a metallic ink (see, for example, JP-A-2009-233883, JP-A-2010-052225, and JP-A-2010-052226).

In the related art, it has been disadvantageously difficult to appropriately generate print data including a metallic color.

SUMMARY

Some aspects of the invention may advantageously solve at least a part of the above-described disadvantage, and may be implemented as the following embodiments or application examples.

APPLICATION EXAMPLE 1

According to an application example 1, an image data generation device that generates print data for a printing apparatus capable of forming a metallic dot and a non-metallic dot is provided in which, when a skewness of brightness of a print target image is a first skewness, print data is generated such that an ink amount of a metallic ink is a first amount and, when the skewness of brightness is a second skewness that is larger than the first skewness, print data is generated such that the ink amount is a second amount that is larger than the first amount.

According to this application example, printing data including data on a metallic color may be appropriately generated. The "skewness" is an index representing distribution asymmetry. A small "skewness of brightness" indicates that the distribution of brightness is biased toward higher values, and vice versa. When an image content has high contrast or the sense of depth of an image is high, the "skewness of brightness" tends to be larger. On the other hand, when an image content has low contrast and the sense of depth of an image is low, the "skewness of brightness" tends to be smaller. An image content with a metallic feeling which is suitable for color reproduction using the metallic ink is the former case. An image content for which it is not preferable to reproduce a metallic feeling or a vague image content is the latter case. Because of such features of the images, it may be determined that an image having the second skewness is suitable for printing using an increased amount of metallic ink. The "ink amount" used herein is a dimensionless number. This ink amount may be restated as "ink coverage" or "recording density per unit area." That is, the expression "the magnitude of the ink amount" may refer to the magnitude of the number of dots or the magnitude of coverage.

APPLICATION EXAMPLE 2

According to an application example 2, the print data generation device of the application example 1 includes a weighted average color separation section that sets as a target of halftone processing a value calculated using a weighted average of an ink amount obtained by performing color separation on the print target image by a first method in which the print target image which underwent color separation includes the metallic ink and an ink amount obtained by performing color separation on the print target image by a second method in which the print target image which underwent color separation does not include the metallic ink, and the weighted average is calculated on the basis of the skewness of brightness.

According to this application example, regardless of color separation in which the ink amount is the first amount and color separation in which the ink amount is the second amount, color separation may be executed by the first and second methods. In color separation, whether the ink amount is the first amount or the second amount is determined depending on the skewness of brightness. Note that, in order to adapt this application example to the application example 1, the weighted average coefficient used in the second method may be preferably set to be larger than the weighted average coefficient used in the first method. Also, even when a user does not specify pixels in which dots are formed using the metallic ink on a pixel-by-pixel basis, whether or not the metallic ink is ejected and the ink amount may be determined on a pixel-by-pixel basis.

APPLICATION EXAMPLE 3

According to an application example 3, in the print data generation device of the application example 2, for an artificial image, regardless of the skewness of brightness, a value obtained by color separation by the first method is a target of the halftone processing.

According to this application example, for an artificial image, color separation may be appropriately performed without depending on the skewness of brightness. The term "artificial image" used herein means an image drawn by a computer or a hand drawn image, not an image obtained by imaging a natural landscape or the like. Examples of the artificial image include, for example, a letter, a geometric line, an illustration, and a logo, etc. For such an artificial image, a user might want to emphasize luster of the image. According to this application example, the luster of an artificial image may be emphasized.

APPLICATION EXAMPLE 4

According to an application example 4, in the print data generation device of the application example 2 or the application example 3, for a human face image, regardless of the skewness of brightness, a value obtained by performing color separation by the second method is a target of the halftone processing.

According to this application example, color separation may be appropriately performed on colors of a human face without depending on the skewness of brightness. This is because it seems that reproducibility of colors of a human face is better when a human face image is printed without using the metallic ink.

APPLICATION EXAMPLE 5

According to an application example 5, in the print data generation device of the application example 4, a type of object detection that is performed on the print target image is changed in accordance with information obtained via a user interface.

According to this application example, the type of object detection that is performed on the print target image may be changed in accordance with information obtained via a user interface. For example, information for selection made by a user on whether or not to perform face recognition for detecting a human face is obtained, and whether or not face recognition is performed as object detection is changed according to the obtained information. Alternatively, for example, the print data generation device may be configured so that information for whether or not to exclude gold from targets of dot forming by the printing apparatus is obtained, face recognition is not performed when gold is excluded, and face recognition is performed when gold is not excluded. In this case, when gold is excluded, additional processing, which is not performed on other types of images, does not have to be performed on a human face image. With gold excluded, a color of skin of Mongoloids may be appropriately color-separated even when the metallic color is added after color separation.

APPLICATION EXAMPLE 6

According to an application example 6, in any one of the print data generation devices of the application examples 2 to 5, for a memory color region, regardless of the skewness of brightness, a value obtained by performing color separation by the second method is a target of the halftone processing.

According to this application example, the memory color may be appropriately color-separated without depending on the skewness of brightness.

Any one of the above-described application examples may be also realized by some other embodiment. For example, a method into which any one of the above-described application examples is changed, a printing apparatus, a print matter generation method, and a printing method that performs printing on the basis of print data generated by one of the methods of the above-described application examples, a program that realizes any one of the above-described application examples, and a non-temporary memory medium that stores the program, etc. may be adopted.

BRIEF DESCRIPTION OF THE DRAWINGS

The invention will be described with reference to the accompanying drawings, wherein like numbers reference like elements.

DESCRIPTION OF EXEMPLARY EMBODIMENTS

1. Printing System (FIG. 1)

Figure 1:
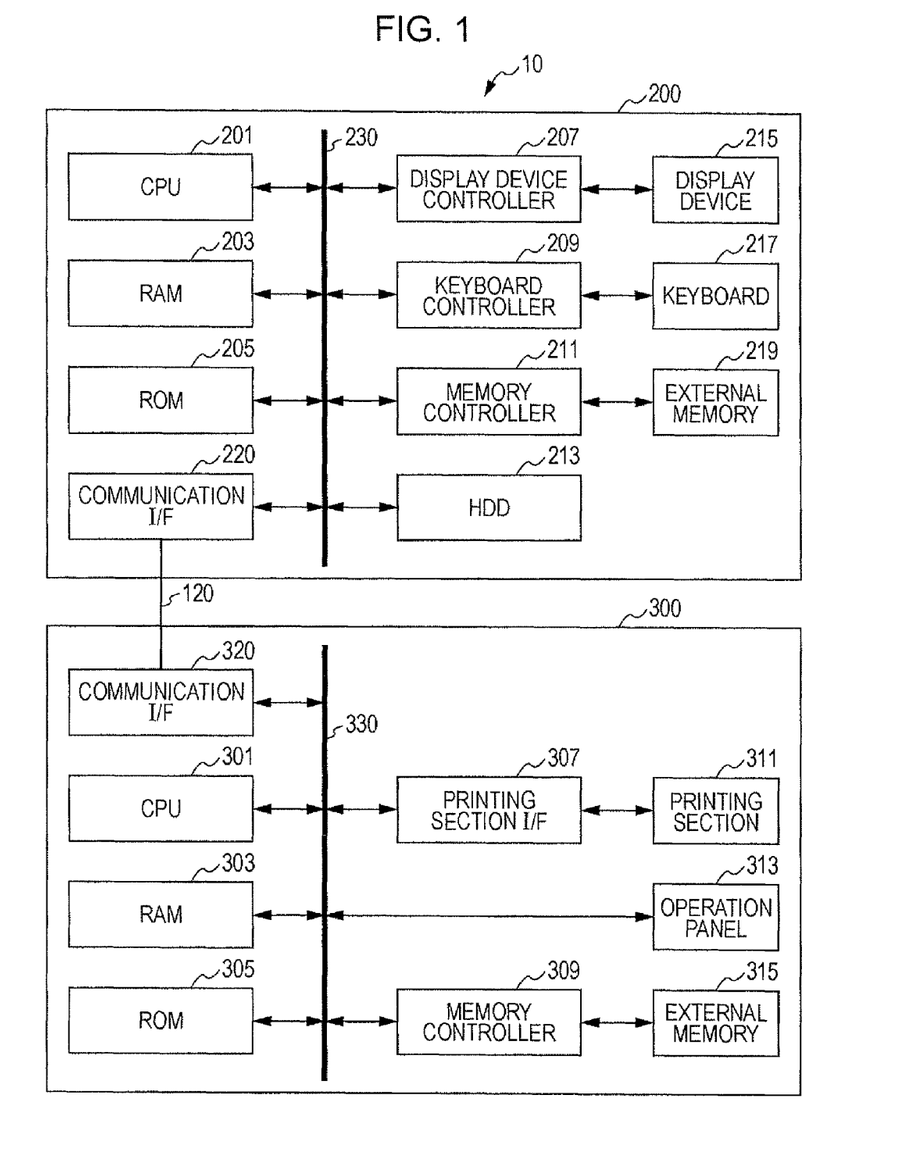
FIG. 1 is a configuration diagram of a printing system.

FIG. 1 illustrates a configuration of a printing system 10. The printing system 10 includes a host computer 200 and a printer 300. The host computer 200 transfers data (which will be hereinafter referred to as "print data") for printing to the printer 300. The printer 300 prints an image on a printing sheet on the basis of the print data transferred from the host computer 200. The print data is data obtained by converting display image data by a printer driver, and dot data indicating whether or not dots of each color are formed in each pixel. The display image data is used for displaying an image on a display device 215 provided in the host computer 200.

The host computer 200 includes a CPU 201, a RAM 203, a ROM 205, a display device controller 207, a keyboard controller 209, a memory controller 211, a hard disk drive (HDD) 213, and a communication interface (I/F) 220. These constituent elements are connected to one another via a bus 230. A display device such as the display device 215 is connected to the display device controller 207. An input device such as a keyboard 217 and a mouse (not illustrated), etc. is connected to the display device controller 207, and an external memory 219 is connected to the memory controller 211. The communication I/F 220 is a module for enabling wired connection to other devices via a USB. The CPU 201 reads a program stored in the HDD 213 to the RAM 203 to execute the program in order to control the operation of the entire host computer 200.

The ROM 205 stores a metallic LUT and a non-metallic LUT. The metallic LUT is a LUT using CMYKMe (cyan, magenta, yellow, block, and metallic) as colors after color separation. On the other hand, the non-metallic LUT is a LUT using CMYK as colors after color separation.

The display device 215, the keyboard 217, and the mouse (not illustrated) are used for inputting print settings. The print settings will be described in detail later with reference to FIG. 4.

On the other hand, the printer 300 is a serial printer configured to eject inks of CMYKMe from a nozzle provided in a print head to perform, for example, bidirectional printing through two paths. The color of the metallic ink is silver. The printer 300 includes a CPU 301, a RAM 303, a ROM 305, a printing section interface (I/F) 307, a memory controller 309, an operation panel 313, and a communication interface (I/F) 320. These constituent elements are connected to one another via a bus 330. A printing section 311 is connected to the printing section I/F 307, and an external memory 315 is connected to the memory controller 309.

The CPU 301 reads a program stored in the ROM 305 to execute the program in order to control the operation of the entire printer 300. The printing section 311 is a hardware device such as an ink cartridge storing inks, a print head, and a platen, etc. used for ejecting inks to a printing sheet to perform printing. The operation panel 313 is a user interface used for a user to give an instruction regarding printing, or the like. The instruction is, for example, an instruction to stop printing or start up the printer 300, etc.

2. Print Data Generation Processing (FIG. 2)

Figure 2:
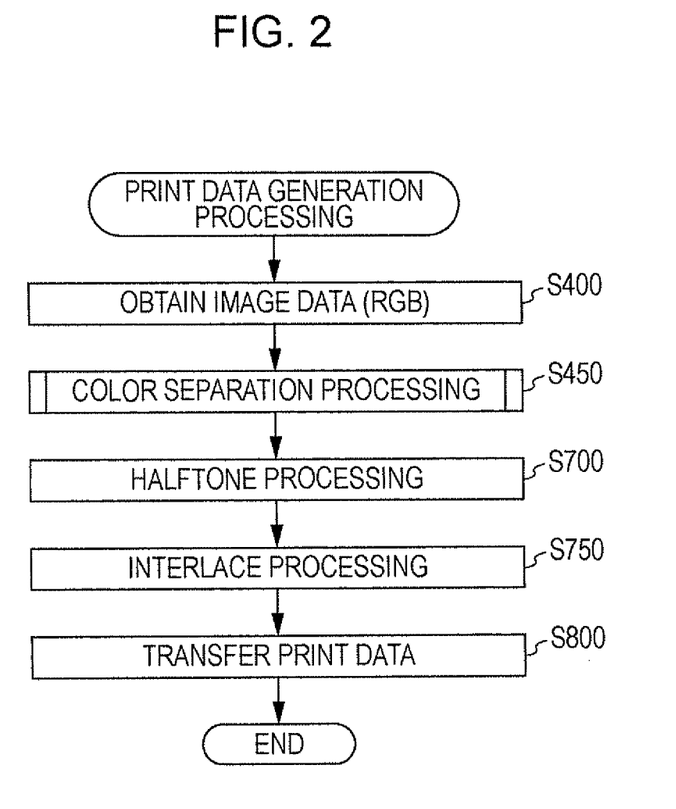
FIG. 2 is a flowchart illustrating print data generation processing.

FIG. 2 is a flowchart illustrating print data generation processing. A main execution body of the print data generation processing is the CPU 201 provided in the host computer 200. Input of a print instruction via the keyboard 217 triggers the print data generation processing. A user may input information specifying the metallic color that is to be excluded from printing with the print instruction from the keyboard 217. In this embodiment, gold, silver, metallic blue, and metallic red are prepared as candidates for a target to be excluded. That is, the metallic LUT corresponds to whether or not each of cold, silver, metallic blue, and metallic red is excluded from printing. Specifically, a plurality of metallic LUTs are provided in accordance with the number of combinations of exclusion and non-exclusion of the metallic colors, and one of the plurality of metallic LUTs is selected in accordance with the information specifying the metallic color that is to be excluded from printing.

When the print data generation processing is started, first, display image data in an RGB format is obtained from the RAM 203 (Step S400). Subsequently, color separation processing is performed on the display image data (Step S450). The details of Step S450 will be described later with reference to FIG. 3 to FIG. 7.

Next, halftone processing is performed on the color-separated image data (Step S700). Through the halftone processing, dot data is generated. Subsequently, interlace processing is performed so that the printer 300 may handle the dot data (Step S750). Finally, data generated in Step S750 is transferred to the printer 300 (Step S800). The printer 300 executes printing on the basis of the transferred data.

3. Color Separation Processing (FIG. 3)

Figure 3:
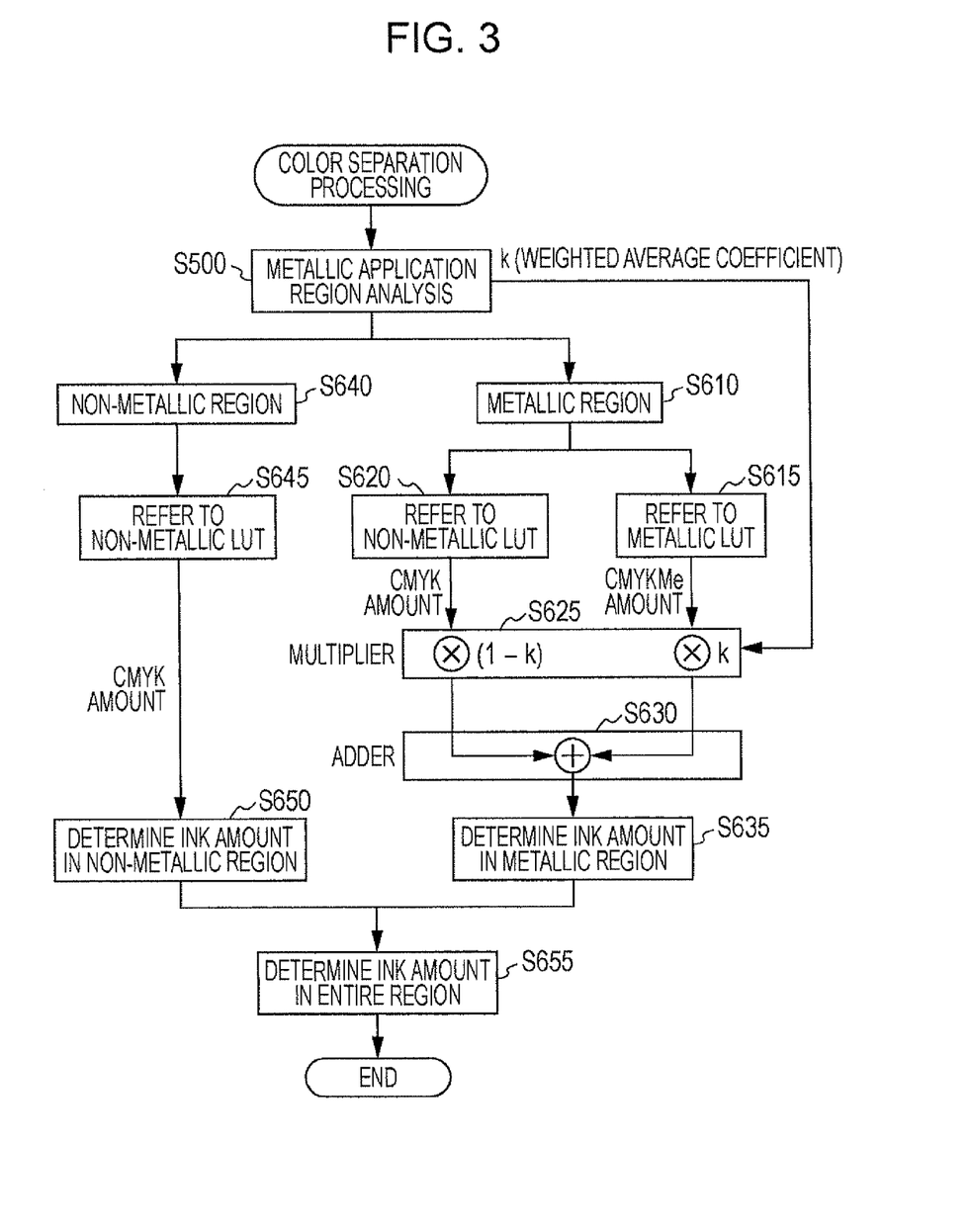
FIG. 3 is a flowchart illustrating color separation processing.

FIG. 3 is a flowchart illustrating color separation processing. As described above, the color separation processing is executed as a part of the print data generation processing.

First, metallic application region analysis is performed (Step S500). The metallic application region analysis is processing in which a print region is separated into a metallic region and a non-metallic region and the weighted average coefficient k is set. The details of the metallic application region analysis will be described later with reference to FIG. 4. The metallic region is a region in which the metallic ink may be ejected. The non-metallic region is a region in which the metallic ink is not ejected. The weighted average coefficient k is a coefficient used in calculating a weighted average of an output using the metallic LUT (respective ink amounts of CMYKMe) and an output using the non-metallic LUT (respective ink amounts of CMYK). The weighted average is calculated in Step S625 which will be described later.

Next, the metallic region (Step S610) separated in Step S500 is color-separated in accordance with respective ink amounts of CMYKMe by referring to the metallic LUT (Step S615). On other hand, the metallic region (Step S610) separated in Step S500 is color-separated in accordance with respective ink amounts of CMYK by referring to the non-metallic LUT (Step S620).

Subsequently, each of the ink amounts obtained in Step S615 and Step S620 is inputted to a multiplier (Step S625). The multiplier multiplies each of the ink amounts of CMYKMe by the weighted average coefficient k and multiplies each of the ink amounts of CMYK by (1−k).

Next, an output from the multiplier is inputted to an adder (Step S630). The adder adds the ink amounts of the same color. That is, for each of CMYK, a value obtained by adding a value obtained by multiplying an ink amount by the weighted average coefficient k and a value obtained by multiplying an ink amount by (1−k) is outputted. For Me, a value obtained by multiplying an ink amount by the weighted average coefficient k is outputted. The ink amount in the metallic region is determined on the basis of an output result of the adder (Step S635).

On the other hand, the non-metallic region (Step S640) separated in the Step S500 is color-separated in accordance with the ink amounts of CMYK by referring to the non-metallic LUT (Step S645). The ink amount in the non-metallic region is determined on the basis of a result of the color separation (Step S650).

Finally, the ink amount in the metallic region and the ink amount in the non-metallic region are determined as the ink amount in the entire region (Step S655).

4. Metallic Application Region Analysis (FIG. 4)

Figure 4:
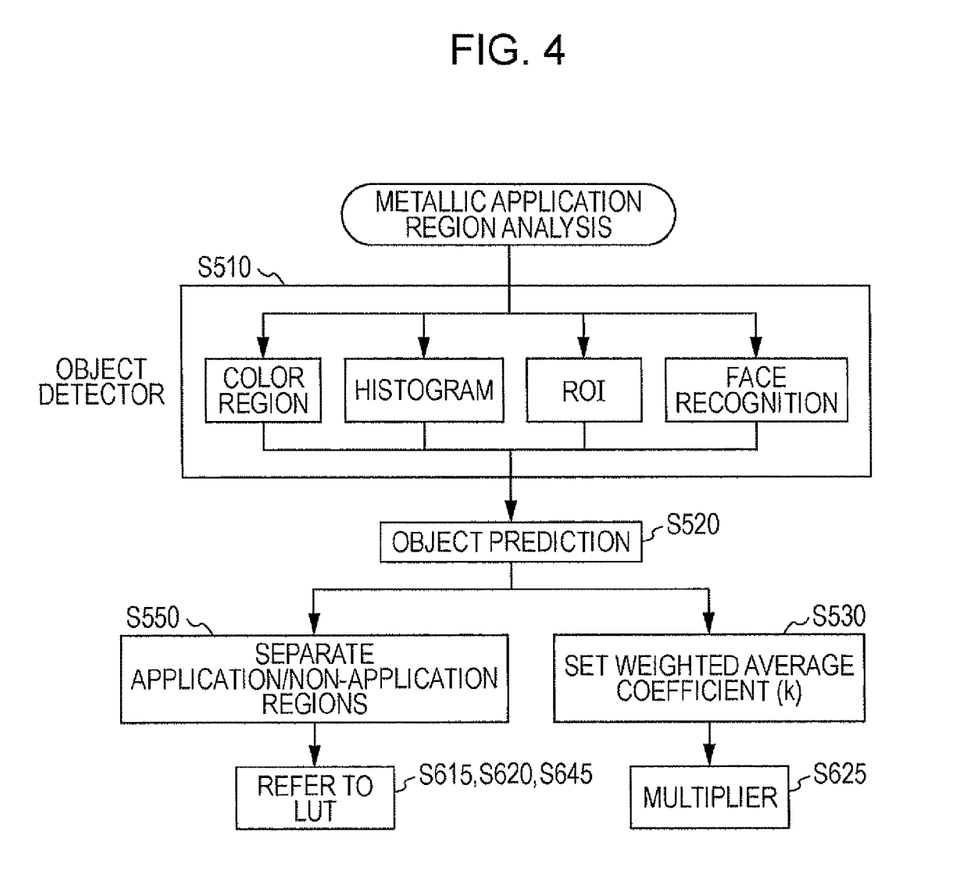
FIG. 4 is a flowchart illustrating metallic application region analysis.

FIG. 4 is a flowchart illustrating the above-described metallic application region analysis. A flow illustrated in this flowchart is executed as a part of print data generation processing, and furthermore, as a part of color separation processing, and therefore, a main execution body of the flow is the CPU 201. First, obtained image data is inputted to an object detector (Step S510). As illustrated in FIG. 4, the object detector has detection functions using a color region, a histogram, a ROI, and face recognition. The details of each detection function will be described later.

Next, an object is predicted on the basis of detection of the object detector (Step S520). Subsequently, the weighted average coefficient k is set on the basis of the prediction (Step S530). The set weighted average coefficient k is inputted to the multiplier, as described above (Step S625).

On the other hand, a region (the metallic region) in which the metallic LUT may be applied and a region (the non-metallic region) in which the metallic LUT is not applied are separated from each other (Step S550). The separated metallic region is inputted to the metallic LUT (Step S615) and the non-metallic LUT (Step S620), as described above, and, on the other hand, the separated non-metallic region is inputted to the non-metallic LUT (Step S640), as described above.

5. Histogram (FIG. 5)

Figure 5:
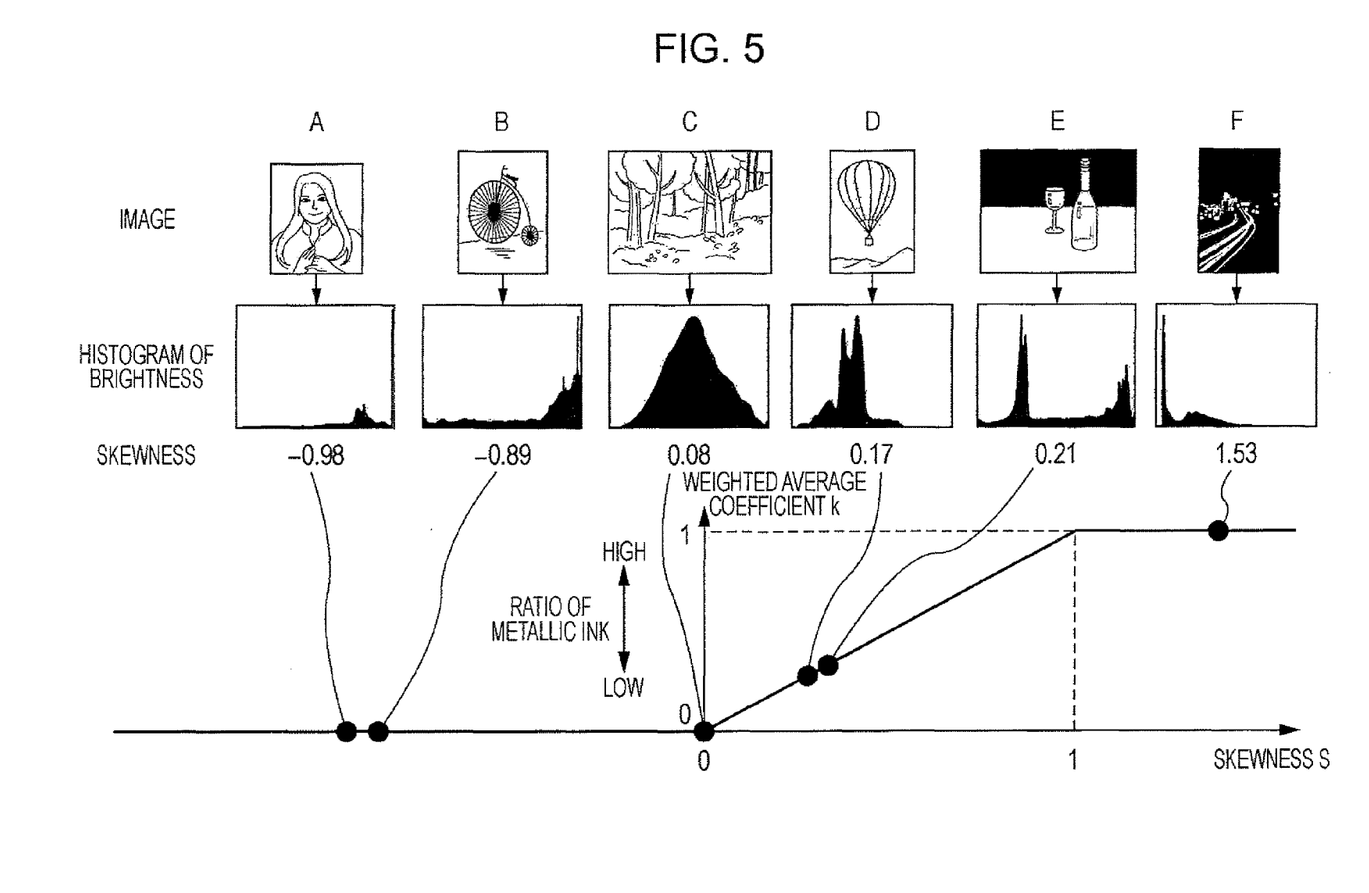
FIG. 5 is a diagram illustrating the relationship among image, histogram of brightness, skewness, and weighted average coefficient.

FIG. 5 is a diagram illustrating a histogram. The histogram is illustrated as one of the above-described functions of the object detector. This histogram is a histogram of brightness in the metallic region of the obtained data from which the non-metallic region is excluded.

FIG. 5 illustrates the relationship among each image and the histogram of brightness, the skewnesses S, and the weighted average coefficient k thereof. Images A, B, C, D, E, and F are images obtained by imaging a person, a bicycle, plants and trees, a balloon floating in the sky, lustrous dishes, and night view, respectively. As is known in the art, the skewness S is calculated using the following expression 1.

$$\text{Skewness } S = \frac{\sum_{i}^{n}\left\{\frac{(x_i - \bar{x})}{Sd}\right\}^3}{n} :$$ [Expression 1]

$\bar{x}$ is an average value, and $Sd$ is a standard deviation.

FIG. 5 illustrates the histogram of brightness and the skewness S for each of the images (A) to (F). For each of the images (A) and (B), as illustrated by the histograms thereof, the distribution of the brightness is biased toward higher values, and thus, the skewness S is negative. For the image (C), the brightness shows approximately a normal distribution, and thus, the skewness S is close to zero, i.e., 0.08. For the images (D), (E), and (F), the distribution of the brightness is biased toward lower values, and thus, the skewness S is positive. Since the degree of bias for the image (E) is higher than that for the image (D) and the degree of bias for the image (F) is higher than that for (E), the skewness S for the image (E) is larger than that for the image (D) and the skewness S for the image (F) is larger than that for the image (E).

The skewness S is calculated in the above-described manner, the weighted average coefficient k is set. Specifically, as illustrated in FIG. 5, the weighted average coefficient k is set by substituting the skewness S into the relationship of k=0 (S<0), k=S(0≤S<1), k=1(S≥1).

Note that, because of properties of the multiplier (Step S525), when the weighted average coefficient k is zero, the ink amount of Me is also zero. Accordingly, without adding a detection result of some other detection function, the respective ink amounts of CMYK obtained by referring to only the non-metallic LUT are determined as the ink amount in the entire region.

6. ROI (FIG. 6)

Figure 6:
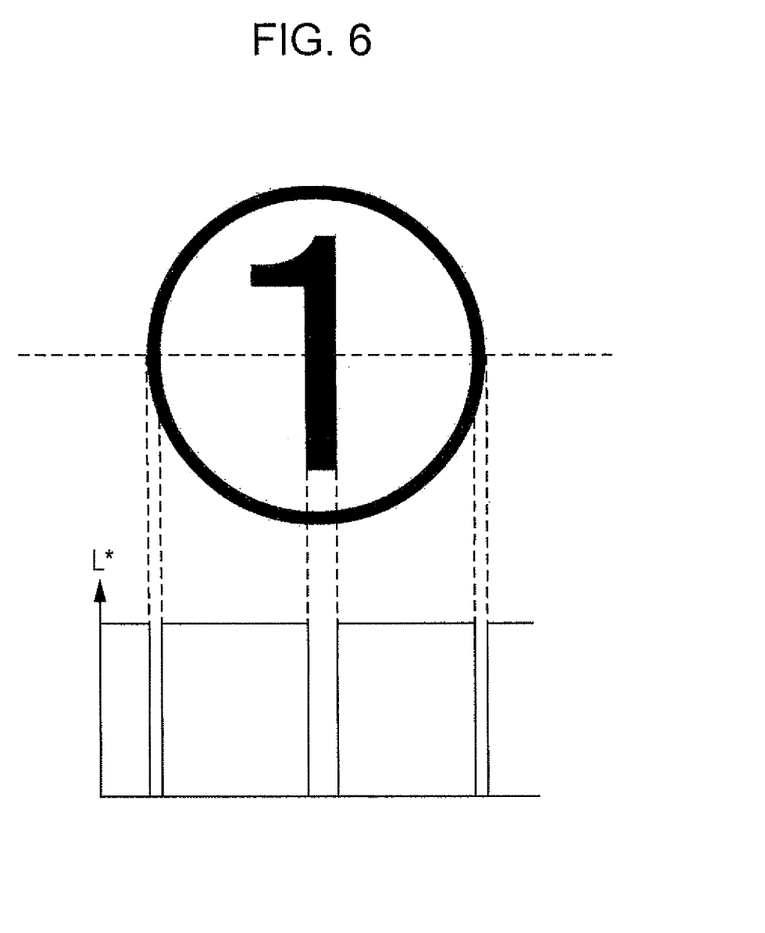
FIG. 6 is a diagram illustrating a specific example of brightness edge detection.

FIG. 6 is a diagram illustrating ROI. The ROI is illustrated as one of the above-described functions of the object detector. The ROI is used in determining whether an image is an artificial image or a natural image.

An artificial image is not an image obtained by imaging a natural landscape but an image drawn on a computer or a hand drawn image. Examples of the artificial image include, for example, a letter, a line, and an illustration, etc. Extraction of the artificial image is performed using brightness edge detection.

FIG. 6 illustrates an example of extraction of an artificial image by brightness edge detection. FIG. 6 illustrates change in brightness in a horizontal direction in a central part represented by circled letter "1". As illustrated in FIG. 6, for an artificial image, it is likely that the brightness changes markedly, and a strong edge is detected. On the other hand, for a natural image obtained by imaging a landscape or the like, it is likely that such a strong edge is not detected. Using this difference, an artificial image is extracted. Note that, for a region of an extracted artificial image, as the metallic region, the metallic LUT and the non-metallic LUT (Step S615, Step S640) may be used and, as another option, only the metallic LUT may be used (not illustrated).

7. Color Region

The term "color region" used herein means processing of extracting a region (which will be hereinafter referred to as a "specific color region") having a specific color. One of the above-described functions of the object detector is realized by using this extraction. The extraction is performed in order to separate the specific color region as the non-metallic region. In this embodiment, as the specific color, a color (which will hereinafter referred to as a "specified color") specified by a user and a memory color are adopted. The specified color is a color specified as the metallic color which is to be excluded from a print image via a user interface.

As known in the art, the memory color is a color stored in association with an image. The memory colors adopted in this embodiment are as given in the following table 1. In particular, "light skin color" in Table 1 is a memory color for Japanese people.

TABLE 1

|  | L* | a* | b* | R | G | B |
|---|---|---|---|---|---|---|
| LIGHT SKIN COLOR | 66 | 19 | 29 | 194 | 150 | 130 |
| SKY BLUE | 49 | −4 | −10 | 98 | 122 | 157 |
| LEAF COLOR | 43 | −10 | 29 | 87 | 108 | 67 |

Note that, when gold is a specified color and is excluded, a region of "light skin color" may be excluded from extraction targets. When gold is excluded, the ink amount of Me used for printing light skin color is highly likely to be small or zero. On the other hand, when gold is not excluded, for example, the "light skin color" may be separated as the specific color region (not illustrated). In this embodiment, as the ink amount corresponding to gold, values which represent reddish gold and pale gold in an L*, a* and b* color coordinate system are adopted. Specifically, the ink amount corresponding to gold is as given in the following table 2.

TABLE 2

|  | L* | a* | b* |
|---|---|---|---|
| REDDISH GOLD | 53-71 | 11-13 | 24-26 |
| PALE GOLD | 50-69 | 2-4 | 24-39 |

8. Face Recognition

The term "face recognition" herein means processing of extracting a human face image using a well-known method. One of the above-described functions of the object detector is realized by using this extraction. The extraction is performed in order to separate the human face image as the non-metallic region. This is because the human face image exhibits higher image quality when being printed without using the metallic ink. Note that, when gold is a specified color and is excluded, face recognition does not have to be executed. A reason for this is the same as the reason described above for the light skin color. On the other hand, when gold is not excluded, the human face image may be separated as the non-metallic region by executing face recognition, and the non-metallic LUT may be used (Step S645).

9. Color Separation Processing (FIG. 7)

Figure 7:
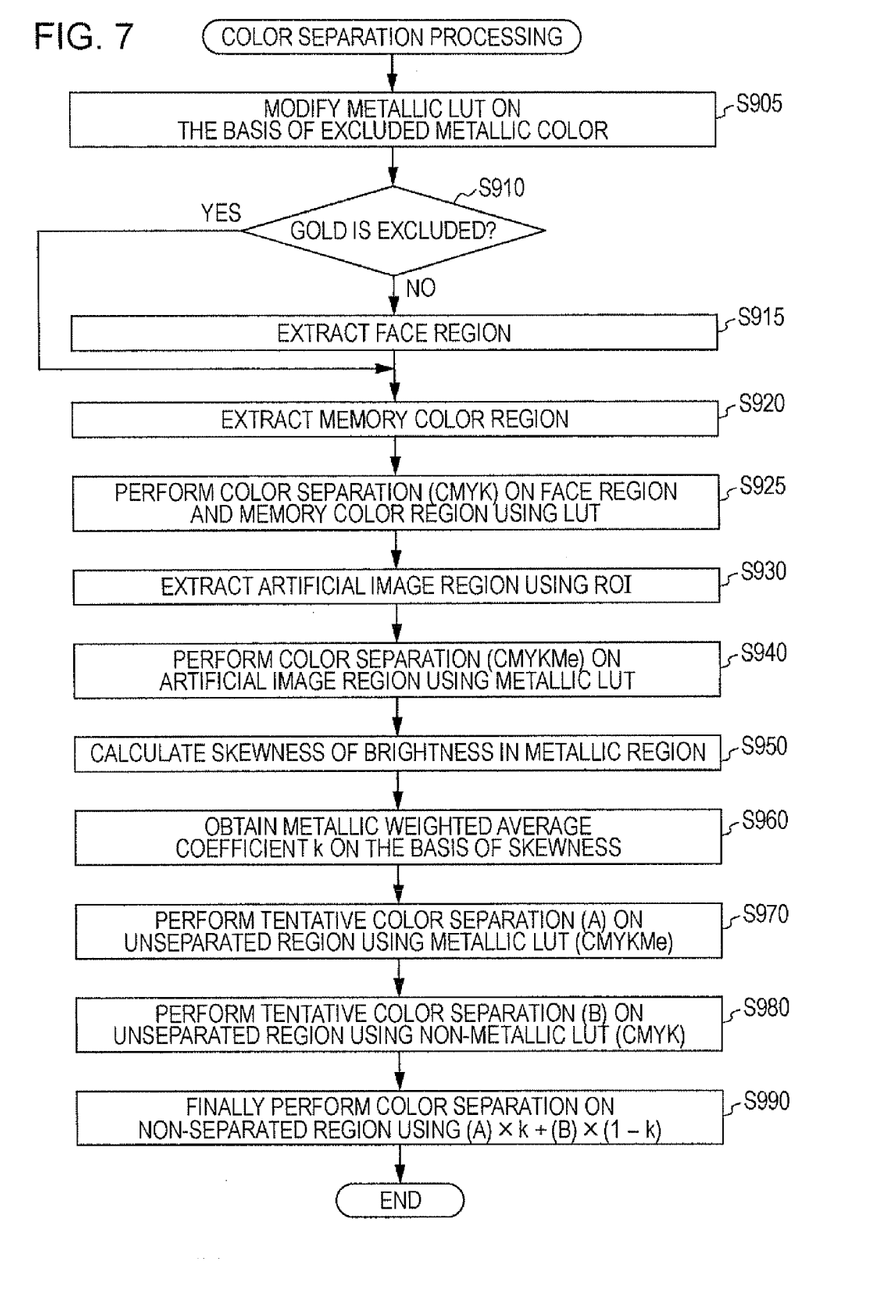
FIG. 7 is a flowchart illustrating color separation processing.

FIG. 7 is a flowchart illustrating color separation processing. The flowchart represents an example obtained by reformulating the color separation processing illustrated in FIG. 3 and FIG. 4.

First, the metallic LUT is adjusted to the excluded metallic color (Step S905). However, if no metallic color is excluded, this adjustment is not executed. For example, when gold is excluded among metallic colors of gold, silver, metallic blue, and metallic red, the metallic LUT with which gold is not used for printing is selected.

Next, whether or not gold is excluded is determined (Step S910). If gold is not excluded (NO in Step S910), a human face region is extracted by a well known method (Step S915). On the other hand, when gold is excluded (YES in Step S910), Step S915 is skipped. Subsequently, a memory color region is extracted (Step S920).

Next, color separation is performed on the region or regions extracted in Step S915 and Step S920 using the non-metallic LUT (Step S925). However, if there is no extracted region, Step S925 is not executed. Subsequently, an artificial image region is extracted using the ROI (Step S930).

Next, color separation is performed on the extracted artificial image region using the metallic LUT (Step S940). Subsequently, the skewness S of brightness in the metallic region is calculated using the above-described method (Step S950), and the weighted average coefficient k of the metallic LUT is obtained using the above-described relationship (Step S960). Next, tentative color separation is performed on an unseparated region using the metallic LUT (Step S970). The unseparated region is a region which is not separated in Step S925 and Step S940, i.e., the metallic region from which the non-metallic region and the artificial image region are excluded. Note that, when the weighted average coefficient k=0, Step S970 is omitted. As described above, a reason for this is that, if the weighted average coefficient k=0, a result of separation using the metallic LUT is not reflected to a final color separation result at all.

Subsequently, tentative color separation is preformed on the unseparated region using the non-metallic LUT (Step S980). For the same reason as that in Step S970, when the weighted average coefficient k=1, Step S980 is omitted.

Finally, a weighted average as a color separation result of Step S970 and S980 is calculated to obtain a final color separation result for the unseparated region (Step S990). Specifically, values are obtained by multiplying respective values of CMYKMe obtained using the metallic LUT by the weighted average coefficient k, and values are obtained by multiplying respective values of CMYK obtained using the non-metallic LUT by (1−k). Then, values representing the same color are added together to obtain the ink amount for the metallic region.

A target on which halftone processing is performed in Step S700 described above is the ink amount obtained in Step S925, Step S940, and Step S990.

10. Advantages

According to the above-described embodiment, printing including the metallic color may be appropriately executed. As the skewness of brightness increases, the amount of the metallic ink increases, and therefore, luster of print matter is appropriately represented.

Color separation used for realizing the above-described ink amount of the metallic ink is realized by simple processing using the weight average of the metallic LUT and the non-metallic LUT. The weighted average coefficient k may be determined in a simple manner by referring to the relationship determined in advance. Furthermore, by performing color separation using the weighted average described above, even when the weighted average coefficient k changes, the total sum of the ink amounts of all colors hardly changes. Accordingly, degradation of image quality due to change in the ink amount of the metallic ink is reduced. Also, even when a user does not specify pixels in which dots are formed using the metallic ink on a pixel-by-pixel basis, whether or not the metallic ink is ejected and the ink amount may be determined on a pixel-by-pixel basis. That is, as a result of an object detection, for a region in which the metallic LUT may be used, whether or not the metallic ink is ejected and the ink amount may be determined in accordance with the skewness of brightness. Note that, even in the region in which the metallic LUT may be used, there may be pixels in which dots are not formed by the metallic ink, depending on the skewness of brightness.

On the other hand, color separation is performed on a human face image and a memory color image using only the non-metallic LUT, regardless of the skewness of brightness. That is, printing is performed not using the metallic ink, and thus, an even higher quality image is realized. Similarly, color separation is performed on an artificial image using only the metallic LUT, regardless of the skewness of brightness. That is, printing is performed using the metallic ink as much as possible, and thus, an image with even higher quality is realized.

11. Correspondence Relationship Between Embodiments and Application Examples

Steps S610 to S655 or Step S970 to S990 correspond to a software that realizes the weighted average color separation section. Steps S610 to S655 or Steps 970 to 990 correspond to the application examples 1 and 2.

12. Verifying Method

An example method for verifying whether or not an embodiment described in the application example 1 is implemented will be described. As images of print targets, an image α and an image β are prepared. The image β is generated on the basis of the image α by performing adjustment to increase the skewness. Adjustment of skewness is performed by adjusting a gradation curve of the image α and changing a contrast while maintaining the highlight and shadow of a gradation. However, in a predetermined region occupying a part of the image, the skewness is not adjusted. If, when both of the images are printed, the ink amount of the metallic ink in the predetermined region of the image β is larger than the ink amount of the metallic ink in the predetermined region of the image α, it may be determined that the embodiment of the application example 1 is implemented.

As another option, in the above-described method, the skewness may be adjusted also in the predetermined region. In this case, "the ink amount of the metallic ink" in the predetermined region is compared. If the ink amount in the image β is larger than the ink amount in the image α, it may be determined that the embodiment of the application example 1 is implemented. These verifying methods are merely examples, and the verification may be performed by some other method.

13. Other Embodiments

Embodiments of the invention are not limited to the above-described embodiment, but aspects of the invention may be implemented in various embodiments without departing from the technical scope of the invention. For example, technical features of embodiments corresponding to the technical features in each embodiment described in the summary section may be appropriately replaced or combined in order to solve a part or all of the above-described problems or achieve a part or all of the above-described advantages. The technical features may be appropriately omitted unless they are described as essential features. As other options, for example, the following embodiments may be adopted.

The relationship between the skewness S and the weighted average coefficient k may be different from that of the above-described embodiment. For example, the weighted average coefficient k may be non-linearly increased relative to the skewness S. For example, the relationship represented by $k=0 (S<g)$, $k=[\{1/h-g)\}(S-g)]^n (g \leq S < b)$, $k=1 (S \geq b)$, $(g \leq b, n>0)$ may be adopted. Note that, when $n \times 1$, the weighted average coefficient k linearly changes. Furthermore, when $g=0$ and $h=1$ are satisfied, the relationship corresponds to that of the above-described embodiment. Alternatively, the weighted average coefficient k may be increased in a stepwise manner. For example, the relationship represented by k=0 (S<i), k=α(i≤S<j), k=β(i≤S<m), . . . , k=1(S≥z), (0<α<β< . . . <1) may be adopted. As another option, the weighted average coefficient k may be increased relative to increase in skewness S in a non-monotonic method.

In color separation processing, an operation of the weighted average does not have to be executed each time. For example, when sufficient memory capacity is reserved, a LUT corresponding to each value that may be possibly calculated for the weighted average coefficient k may be obtained in advance and stored. Thus, instead of the processing regarding the weighted average (Steps S610 to S635 or Steps S970 to S990), an obtained LUT corresponding to the weighted average coefficient k may be specified and color separation using the LUT may be performed. Therefore, a processing load may be reduced.

In calculation of the skewness S (Step S510 or Step S950) in color separation processing, the skewness S of brightness of an entire image may be obtained, instead of the skewness S of brightness in the metallic region.

A parameter correlated to the brightness, i.e., for example, a skewness of intensity and a skewness of concentration, etc. may be used, instead of the skewness of brightness.

A region in which the number of colors used is less than a reference value may be extracted as the artificial image region.

A raster image processor (RIP) may be used. For example, the RIP executes color separation processing and halftone processing on data transferred from the host computer 200, and transfers the thus obtained dot data to the printer 300.

A part or all of the functions of the host computer 200 may be incorporated in the printer 300. For example, steps subsequent to color separation processing may be executed by the printer 300.

The plurality of metallic LUTs corresponding to the number of combinations of exclusion and non-exclusion of the metallic colors of gold, silver, metallic blue, and metallic red do not have to be provided. For example, a single metallic LUT is provided and the metallic LUT may be modified in accordance with whether or not each metallic color exists. Modification of the metallic LUT may be implemented by rewriting the metallic LUT, or combining metallic LUTs that are used in building the relationship between the metallic LUT and the ink amount of the metallic ink after color separation.

Object prediction using object detection may be omitted, an entire image may be set as the metallic region, and tentative color separation may be performed using the metallic LUT and the non-metallic region (Step S970, Step S980).

Exclusion of the metallic color (Step S905) may be omitted. Moreover, a user may be prompted to directly input object detection that is to be performed on image data, instead of inputting information specifying a metallic color that is to be excluded from printing. The type of object detection may be changed in accordance with a result thereof.

What is claimed is:

1. An image data generation device that generates print data for a printing apparatus capable of forming a metallic dot and a non-metallic dot, comprising:
 a weighted average color separation section that sets as a target of halftone processing a value calculated using a weighted average of an ink amount obtained by performing color separation on a print target image by a first method in which the print target image which underwent color separation includes a metallic ink and an ink amount obtained by performing color separation on the print target image by a second method in which the print target image which underwent color separation does not include the metallic ink, wherein
 the weighted average is calculated on a basis of a skewness of brightness,
 when the skewness of brightness of the print target image is a first skewness, print data is generated such that the ink amount of the metallic ink is a first amount and, when the skewness of brightness is a second skewness that is larger than the first skewness, a print data is generated such that the ink amount is a second amount that is larger than the first amount, and
 for a human face image, regardless of the skewness of brightness, a value obtained by performing color separation by the second method is the target of the halftone processing.

2. The image data generation device according to claim 1, wherein, for an artificial image, regardless of the skewness of brightness, a value obtained by color separation by the first method is the target of the halftone processing.

3. The image data generation device according to claim 1, wherein a type of object detection that is performed on the print target image is changed in accordance with information obtained via a user interface.

4. The device according to claim 1, wherein, for a memory color region, regardless of the skewness of brightness, the value obtained by performing color separation by the second method is the target of the halftone processing.

5. A printing method using a printing apparatus capable of forming a metallic dot and a non-metallic dot, comprising:
 setting as a target of halftone processing a value calculated using a weighted average of an ink amount obtained by performing color separation on a print target image by a first method in which the print target image which underwent color separation includes a metallic ink and an ink amount obtained by performing color separation on the print target image by a second method in which the print target image which underwent color separation does not include the metallic ink,
 wherein
 the weighted average is calculated on a basis of a skewness of brightness,
 when the skewness of brightness of the print target image is a first skewness, printing is performed such that the ink amount of the metallic ink is a first amount and, when the skewness of brightness is a second skewness that is larger than the first skewness, printing is performed such that the ink amount is a second amount that is larger than the first amount, and
 for a human face image, regardless of the skewness of brightness, a value obtained by performing color separation by the second method is the target of the halftone processing.

6. A non-transitory computer-readable medium storing a program used in a printing apparatus capable of forming a metallic dot and a non-metallic dot, wherein the program causes a computer to realize:
 setting as a target of halftone processing a value calculated using a weighted average of an ink amount obtained by performing color separation on a print target image by a first method in which the print target image which underwent color separation includes a metallic ink and an ink amount obtained by performing color separation on the print target image by a second method in which the print target image which underwent color separation does not include the metallic ink, obtaining a skewness of brightness of the print target image, wherein the weighted average is calculated on a basis of the skewness of brightness, generating, when the skewness of brightness is a first skewness, print data such that the ink amount of the metallic ink is a first amount, and generating, when the skewness of brightness is a second skewness that is larger than the first skewness, print data such that the ink amount is a second amount that is larger than the first amount, wherein for a human face image, regardless of the skewness of brightness, a value obtained by performing color separation by the second method is the target of the halftone processing.

* * * * *